United States Patent
Evans et al.

(10) Patent No.: US 6,882,409 B1
(45) Date of Patent: Apr. 19, 2005

(54) MULTI-SPECTRAL LADAR

(75) Inventors: Bruno J. Evans, Keller, TX (US); Pradip Mitra, Colleyville, TX (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 10/603,707

(22) Filed: Jun. 25, 2003

(51) Int. Cl.[7] .......................... G01C 3/08; G01B 11/26; G01J 5/02
(52) U.S. Cl. ................. 356/4.01; 356/5.01; 356/141.5; 250/339.01; 250/339.02; 250/339.05
(58) Field of Search .............................. 356/4.01–5.15, 356/141.5, 305; 342/53; 250/339.01, 339.02, 339.05, 342

(56) References Cited

U.S. PATENT DOCUMENTS

| | | | | |
|---|---|---|---|---|
| 4,298,280 A | * | 11/1981 | Harney | 356/5.06 |
| 5,317,148 A | * | 5/1994 | Gray et al. | 250/227.26 |
| 5,345,304 A | * | 9/1994 | Allen | 356/5.01 |
| 5,369,276 A | * | 11/1994 | Antesberger | 250/334 |
| 5,528,354 A | * | 6/1996 | Uwira | 356/5.01 |
| 5,682,225 A | * | 10/1997 | DuBois et al. | 356/73 |
| 5,835,204 A | * | 11/1998 | Urbach | 356/5.01 |
| 6,323,941 B1 | | 11/2001 | Evans et al. | 356/4.01 |
| 6,621,764 B1 | * | 9/2003 | Smith | 367/128 |

* cited by examiner

Primary Examiner—Thomas H. Tarcza
Assistant Examiner—Brian Andrea
(74) Attorney, Agent, or Firm—Williams, Morgan & Amerson, P.C.

(57) ABSTRACT

A multi-spectral detector for use in a passive/active system and a method for use in identifying an object in a field of view are disclosed. The multi-spectral detection system comprises an optically dispersive element, a detector array, and an integrated circuit. The optically dispersive element is capable of separating received LADAR radiation and radiation received from a scene into a plurality of spectral components and distributing the separated spectral components; and a detector array. The detector array includes a plurality of detectors capable of detecting the LADAR radiation; and a plurality of detectors capable of detecting the spectral components of the scene radiation. The integrated circuit is capable of generating a plurality of electrical signals representative of predetermined characteristics of the detected LADAR radiation and the detected spectral components. The method comprises passively detecting scene radiation employing a detector array; and actively detecting LADAR radiation through the detector array in parallel with passively detecting the scene radiation.

44 Claims, 6 Drawing Sheets

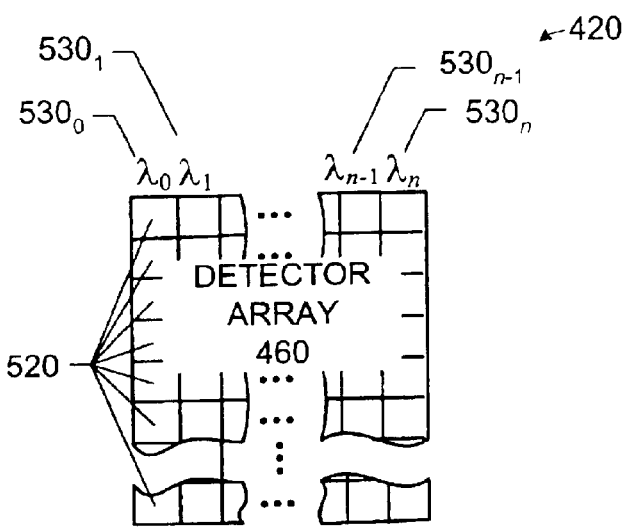
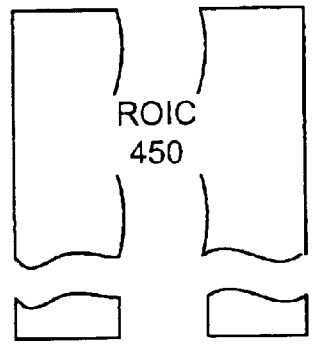
FIG. 5A FIG. 5B
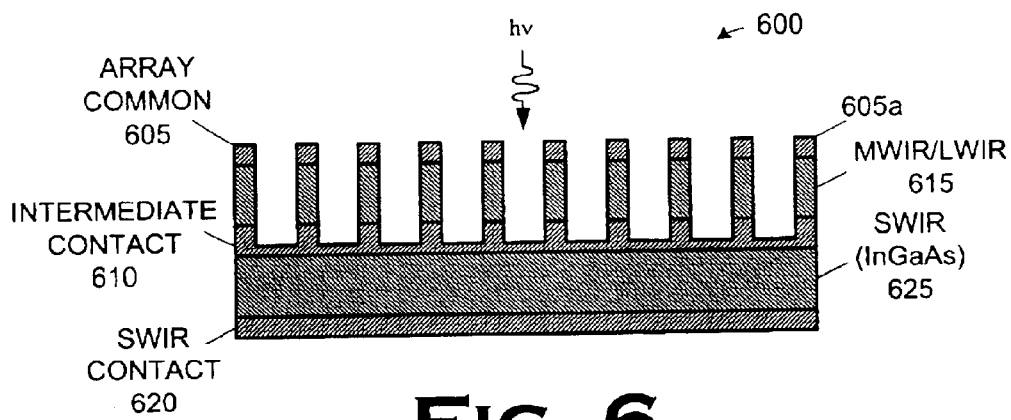
FIG. 6
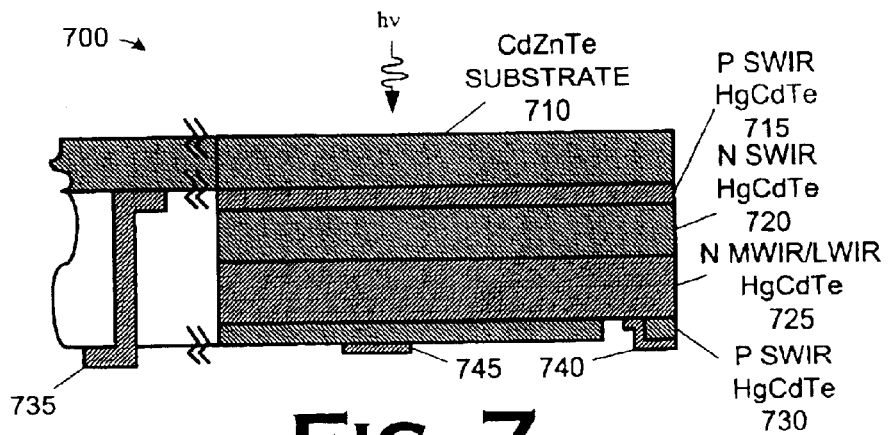
FIG 7

MULTI-SPECTRAL LADAR

BACKGROUND OF THE INVENTION

1. Field of the Invention

The present invention pertains to remote sensing and, more particularly, to a combined passive/active system, e.g., a passive infrared/active LADAR system.

2. Description of the Related Art

A need of great importance in military and some civilian operations is the ability to quickly detect and identify objects, frequently referred to as "targets," in a "field of view." A common problem in military operations, for example, is to detect and identify targets, such as tanks, vehicles, guns, and similar items, which have been camouflaged or which are operating at night or in foggy weather. It is important in many instances to be able to distinguish reliably between enemy and friendly forces. As the pace of battlefield operations increases, so does the need for quick and accurate identification of potential targets as friend or foe, and as a target or not.

Techniques for identifying targets have existed for many years. For instance, in World War II, the British developed and utilized radio detection and ranging ("RADAR") systems for identifying the incoming planes of the German Luftwaffe. RADAR uses radio waves to locate objects at great distances even in bad weather or in total darkness. Sound navigation and ranging ("SONAR") has found similar utility and application in environments where signals propagate through water, as opposed to the atmosphere. While RADAR and SONAR have proven quite effective in many areas, they are inherently limited by a number of factors. For instance, RADAR is limited because of its use of radio frequency signals and the size of the resultant antennas used to transmit and receive such signals. Sonar suffers similar types of limitations. Thus, alternative technologies have been developed and deployed.

One such alternative technology is laser detection and ranging ("LADAR"). Similar to RADAR systems, which transmit radio waves and receive radio waves reflected from objects, LADAR systems transmit laser beams and receive reflections from targets. Systems that both transmit signals and receive reflections, such as RADAR and LADAR, are known as "active systems." Because of the short wavelengths associated with laser beam transmissions, LADAR data exhibits much greater resolution than RADAR data.

Lasers are also used in "semi-active" laser ("SAL") systems. With the SAL system, a narrow laser beam is produced and transmitted toward a target. The laser radiation is typically generated and transmitted from a laser designator aircraft manned by a forward operator or by a ground-based operator. The operator directs the laser radiation to a selected target, thereby designating the target. The laser radiation reflected from the target can then be detected by the laser seeker head of a missile, aircraft, or other platform located remote from both the target and the laser energy transmitter. Because the transmitter is not located on the same platform as the receiver, such systems are not considered "active" systems. Although SAL systems have proven effective, the next generation of receiver platforms are expected to fly to ranges well beyond the range of imaging sensors on board the designator platform.

"Passive" systems are also employed. In passive systems, a detector is used to sense energy produced or reflected from the objects in the scene of interest. One example of a passive system is an infrared sensor that detects heat produced by objects. Alternatively, a light sensor, such as an array of photodiodes, may be used to sense the scene light reflected by the objects in the field of view. Passive, multi-spectral detection in narrow spectral bands is recognized to a highly effective approach for target detection in a thermally cluttered or camouflaged environment. Correlated hyperspectral radiometric measurements in the atmospheric windows in the short wavelength infrared ("SWIR") and midwave infrared ("MWIR") bands have been shown to be effective in detecting low contrast, partially obscured and camouflaged targets. However, when considered in other applications, passive systems have been found to have a number of limitations. For instance, data provided by passive systems is sometimes difficult to interpret, since a given level of light intensity may indicate an object with low reflectivity, or the same intensity level may indicate a distant object with high reflectivity.

Various combinations of active, semi-active, and passive systems have been attempted in the past. However, these combinations usually have many problems limiting their practicability. For instance, SAL systems do not carry the advantages of passive infrared detection while suffering the limitations of active LADAR systems. Combined active LADAR and passive IR systems overcome this problem, but frequently suffer from other problems. For instance, space and weight limitations are usually severe because of the platform requirements on which the systems are deployed. Attempts to combine active LADAR and passive IR systems have problems with these constraints because, e.g., they employ separate optical trains or separate detectors for the LADAR and IR radiation.

The present invention is directed to resolving, or at least reducing, one or all of the problems mentioned above.

SUMMARY OF THE INVENTION

The invention includes, in various aspects, a multi-spectral detector for use in a passive/active system and a method for use in identifying an object in a field of view. The multi-spectral detection system comprises an optically dispersive element, a detector array, and an integrated circuit. The optically dispersive element is capable of separating received LADAR radiation and radiation received from a scene into a plurality of spectral components and distributing the separated spectral components; and a detector array. The detector array includes a plurality of detectors capable of detecting the LADAR radiation; and a plurality of detectors capable of detecting the spectral components of the scene radiation. The integrated circuit is capable of generating a plurality of electrical signals representative of predetermined characteristics of the detected LADAR radiation and the detected spectral components. The method comprises passively detecting scene radiation employing a detector array; and actively detecting LADAR radiation through the detector array in parallel with passively detecting the scene radiation.

BRIEF DESCRIPTION OF THE DRAWINGS

The invention may be understood by reference to the following description taken in conjunction with the accompanying drawings, in which like reference numerals identify like elements, and in which:

FIG. 5A and FIG. 5B conceptually depict the detector array and read-only integrated circuit, respectively, of the focal plane array of the detector of FIG. 4 in top, plan views;

FIG. 6 is a partial, sectional view of a first implementation of a detector in the detector array in FIG. 5A;

FIG. 7 is a partial, sectional view of a second implementation of a detector in the detector array in FIG. 5A;

Figure 1:
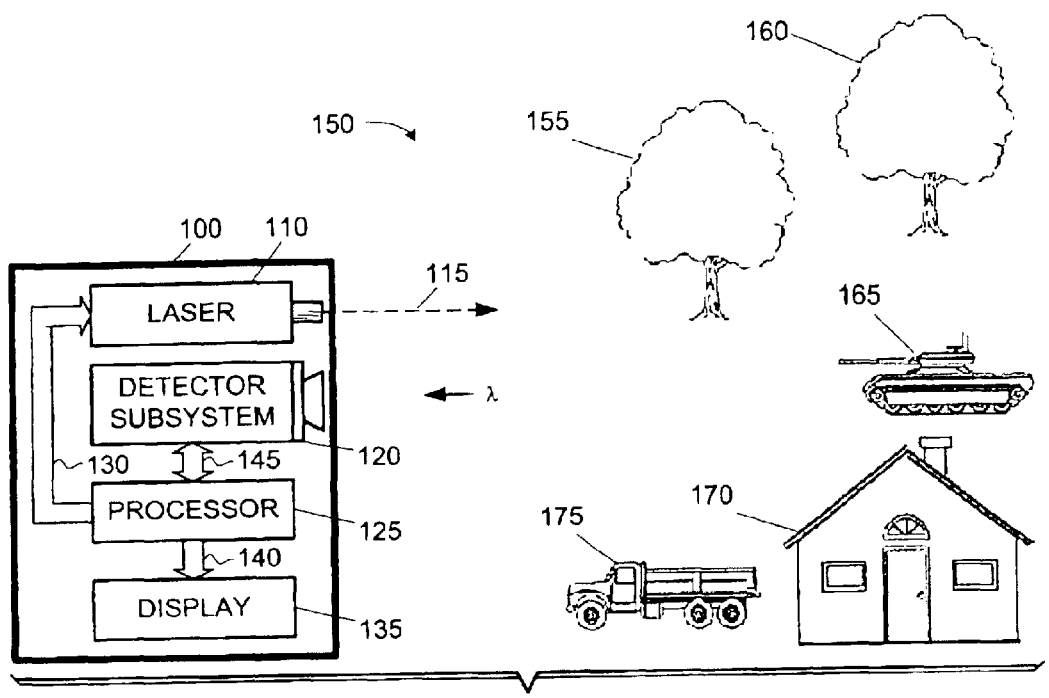
FIG. 1 is a system diagram incorporating the present invention showing the major operational parts of the system as used in a field environment.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 1 illustrates an imaging system 100 constructed and operated in accordance with the present invention. The imaging system 100 includes a laser 110 that produces a laser beam 115, a detector subsystem 120, a processor 125 connected through a line 130 for operating the laser 110, and a display 135 connected via a line 140 to the processor 125. The processor 125 is also connected through a bi-directional data and control line 145 to the detector subsystem 120 and processes data collected by the imaging system 100 from an exemplary scene 150 of an outdoor area. The illustrated scene includes trees 155 and 160, a military tank 165, a building 170, and a truck 175. The tree 155, tank 165, and building 170 are all located at the same distance from the system 100. Note, however, that the scene 150 may have any composition. One application of the imaging system 100, as shown in FIG. 1, is to detect the presence of the tank 165 within the scene 150 under adverse conditions such as darkness, smoke, haze, and other barriers (such as the trees and building) which would prevent a direct visible optical viewing of the tank 165.

As described in further detail below, the imaging system 100 images the scene 150 using both two-dimensional, passively detected data and three-dimensional, actively detected data. In the two-dimensional passive image data set, each pixel (picture element) includes passive intensity information corresponding to the magnitude of the passive energy collected for that pixel. The second mode initializes the laser 110 to produce an active LADAR image by detecting the reflected laser energy. This produces a three-dimensional active image data set in which each pixel of the image has both z (range) and active intensity data. In both the passive and active image data sets, discussed more fully below, each pixel has x (horizontal) and y (vertical) coordinates.

The active LADAR can be implemented using any suitable LADAR transceiver currently known in the art, modified as described below to implement the invention. The operation of one such transceiver 200 is conceptually illustrated in FIG. 2. The LADAR transceiver 200 includes the laser 110 of FIG. 1 as well as some portions of the detector subassembly 120. In the embodiment illustrated in FIG. 2, the imaging system 100 is packaged on a platform 210 and collects data from a field of view 225, shown in FIG. 2, within the scene 150, shown in FIG. 1.

Figure 2:
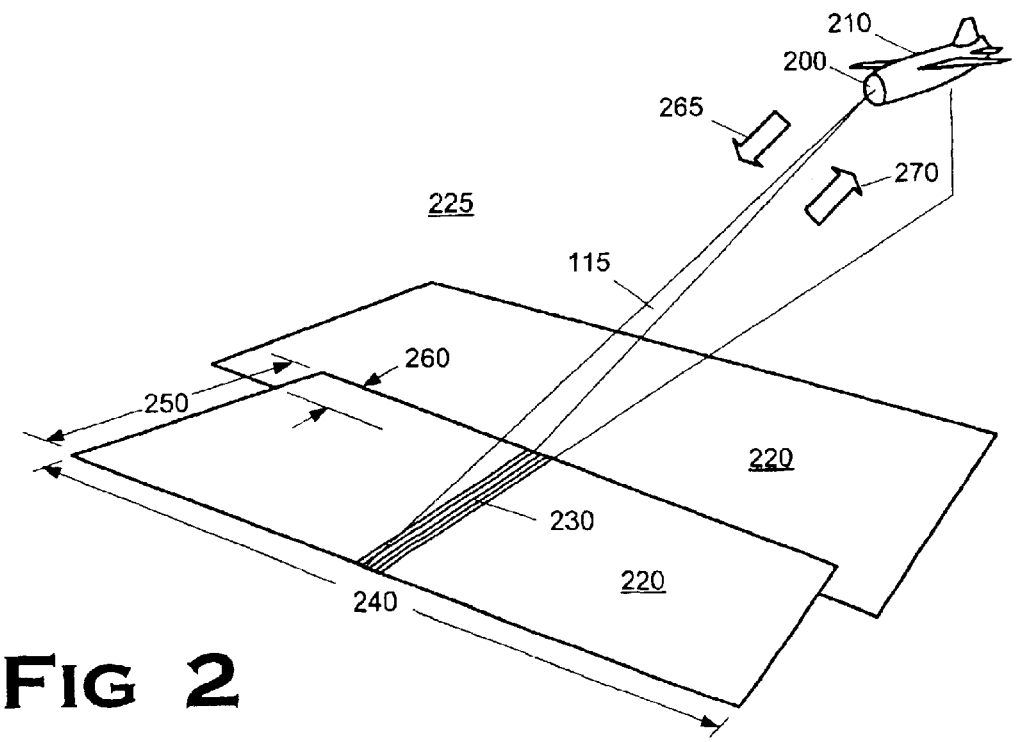
FIG. 2 depicts a passive infrared/active LADAR system constructed and operated in accordance with the present invention to acquire data about a field of view through an optics package aboard a platform shown therein.

The laser signal 115 is transmitted by an optics package (not shown) of the LADAR transceiver 200 on the platform 210 to scan a geographical area called a scan pattern 220. Each scan pattern 220 is generated by scanning elevationally, or vertically, several times while scanning azimuthally, or horizontally, once within the field of view 225 for the platform 210 within the scene 150, shown in FIG. 1. The scan patterns are sometimes, and will be hereafter herein, referred to as "footprints." FIG. 2 illustrates a single elevational scan 230 during the azimuthal scan 240 for one of the footprints 220. Thus, each footprint 220 is defined by a plurality of elevational scans 250 such as the elevational scan 230 and the azimuthal scan 240. The principal difference between the successive footprints 220 is the location of the platform 210 at the start of the scanning process. An overlap 260 between the footprints 220 is determined by the velocity of the platform 210 in the direction of an arrow 265. The velocity, depression angle of the sensor with respect to the horizon, and total azimuth scan angle of the LADAR platform 210 determine the footprint 220 on the ground.

The laser signal 115 is typically a pulsed signal and may be either a single beam or a split beam. Because of many inherent performance advantages, split beam laser signals are typically employed by most LADAR systems. A single beam may be split into several beamlets spaced apart from one another by an amount determined by the optics package (not shown) aboard the platform 210 transmitting the laser signal 115. Each pulse of the single beam is split, and so the laser signal 115 transmitted during the elevational scan 250 in FIG. 2 is actually, in the illustrated embodiment, a series of grouped beamlets. The optics package aboard the platform 210 transmits the laser signal 115 while scanning elevationally 250 and azimuthally 240. The laser signal 115 is continuously reflected back to the platform 210, which receives the reflected laser signal. Suitable mechanisms for use in generation and acquiring active LADAR signals are disclosed in:

U.S. Pat. No. 5,200,606, entitled "Laser Radar Scanning System," issued Apr. 6, 1993, to LTV Missiles and Electronics Group as assignee of the inventors Nicholas J. Krasutsky, et al.;

U.S. Pat. No. 5,224,109, entitled "Laser Radar Transceiver," issued Jun. 29, 1993, to LTV Missiles and Electronics Group as assignee of the inventors Nicholas J. Krasutsky, et al.; and U.S. Pat. No. 5,285,461, entitled "Method for Increasing Single-Pulse Range Resolution," issued to Feb. 8, 1994, to Loral Vought Systems Corporation as assignee of the inventors Nicholas J. Krasutsky, et al.

However, any suitable mechanism known to the art may be employed.

One particular embodiment of the invention includes a LADAR seeker head ("LASH") aboard a flying submunition such as the platform 210 in FIG. 2. The manner in which this LASH generates, transmits, and receives a LADAR scan pattern is fully disclosed and claimed in U.S. Pat. No. 5,200,606, first mentioned above. This particular LASH splits a single 0.2 mRad $1/e^2$ laser pulse into septets with a laser beam divergence for each spot of 0.2 mRad with beam separations of 0.4 mRad. The optics package includes fiber optical array (not shown) having a row of seven fibers spaced apart to collect the return light. The fibers have an acceptance angle of 0.3 mRad and a spacing between fibers that matches the 0.4 mRad far field beam separation. An elevation scanner (not shown) spreads the septets vertically by 0.4 mRad as it produces the vertical scan angle. The optical transceiver including the scanner is then scanned azimuthally to create a full scan raster.

FIG. 2 also conceptually illustrates the passive acquisition of infrared data from the same field of view 225 in which the footprints 220 are defined. The infrared data is extracted from the passive detection of infrared electromagnetic radiation, represented by the arrow 270. The radiation 270 may be, e.g., light waves reflected from or thermal emissions of objects (e.g., the tank 165, building 170, truck 175) within the field of view 225. The radiation 270 will be multi-spectral, i.e., it will include electromagnetic waves of many frequencies. The radiation 270 comprises a portion of the scene conditions within the field of view 225, and do not result from any transmission from the platform 210. Hence, the waves 270 are "passively" detected. As used herein, the phrase "scene radiation" shall mean any radiation existing within the field of view but not having been actively introduced by the imaging system 100.

Both the passive image data set and the near simultaneously collected active LADAR image data set are transmitted via the line 145 to the processor 125. Within the processor 125, data from both the passive image data set and the active image data set are combined to produce a multi-dimensional image data set. Because the passive and active image data sets are collected by the same sensor assembly 105 at approximately the same time (i.e., are temporally aligned), the pixels within the two image data sets are also spatially aligned, that is, objects in the scene 150 are in the same positions x and y for both the passive image and the active LADAR image.

However, the illustrated embodiment provides a hyperspectral resolution within this broadband detection scheme that can yield greater discrimination in identifying objects within the field of view. The illustrated embodiment does this by (1) passively detecting multiple bands of infrared radiation, and (2) doing so at the same time it actively detects the returned LADAR radiation. Because they are detected at the same time, the image data sets derived from the detected radiation can be readily combined. The resulting combined image data, which comprises a multi-dimensional image data set, is provided as a signal through the line 140 for producing an image on the display 135. This image, preferably, can be rotated on a display screen in a manner that produces a three-dimensional representation of objects within the scene 150, in particular a threat object such as the tank 165. The three-dimensional representation of an object further provides an indication of the thermal intensity of the object, e.g., a three-dimensional image. Additionally, the processor 125 can process the multi-dimensional image data set to identify or aid in identifying threat objects such as the tank 165. The processing identifies tank 165 as not only a tank, but whether it is a friend or foe tank. This additional processing substantially decreases the probability of fratricide or being killed by friendly fire.

Figure 3:
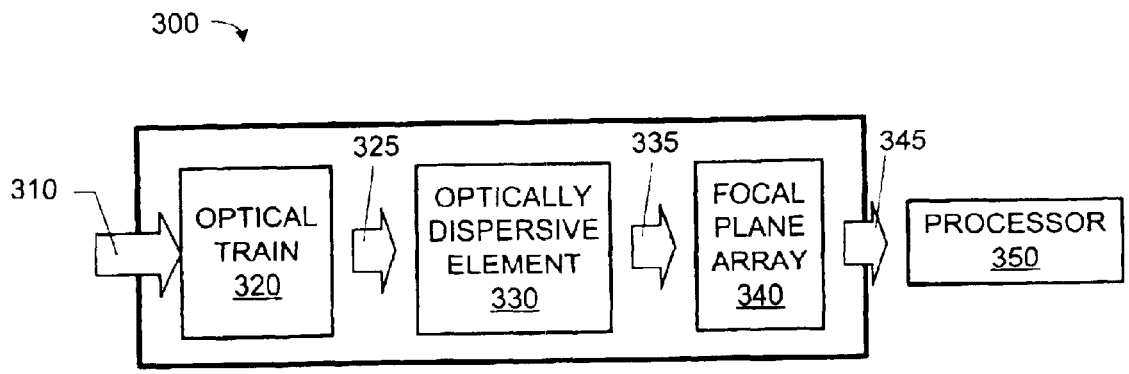
FIG. 3 is a block diagram of a sensor system capable of active and passive acquisition of LADAR and infrared data, respectively, in accordance with the present invention.

FIG. 3 conceptually illustrates one particular embodiment of a system 300 with which the detector subassembly 120 of FIG. 1 may be implemented in accordance with the present invention. The system 300 comprises a collection of operative elements that work in conjunction to collect, detect and process received infrared and LADAR radiation 310. The received radiation 310 is received by an optical train 320 comprising a steerable group of lenses (not individually shown) that collect and focus the received radiation 310. The radiation 325 collected by the optical train 320 is passed to an optically dispersive element 330. The optically dispersive element 330 separates the received radiation 310 into its spectral components 335, as is discussed more fully below, which are then provided to a focal plane array 340. The focal plane array 340 senses each of the spectral components 335 produced by the optically dispersive element 330, also as is discussed more fully below, and generates a corresponding signal output 345. The signal output 345 contains both actively acquired, three-dimensional LADAR data and passively acquired, two-dimensional data.

The signal output 345 of the focal plane array 340 is provided to a processor 350. The processor 350 may be, for example, a heterogenous digital signal processor ("DSP") system which can be expanded to have hundreds of individual DSPs. Any suitable processor known to the art may used to implement the processor 350. The processor 125 also generates elecromechanical command and control signals for the optically dispersive elements 330 and/or the optical train 320 to control their behavior in a manner more fully discussed below. In some embodiments, the processor 125 may delegate this task to a controller (not shown).

Figure 4:
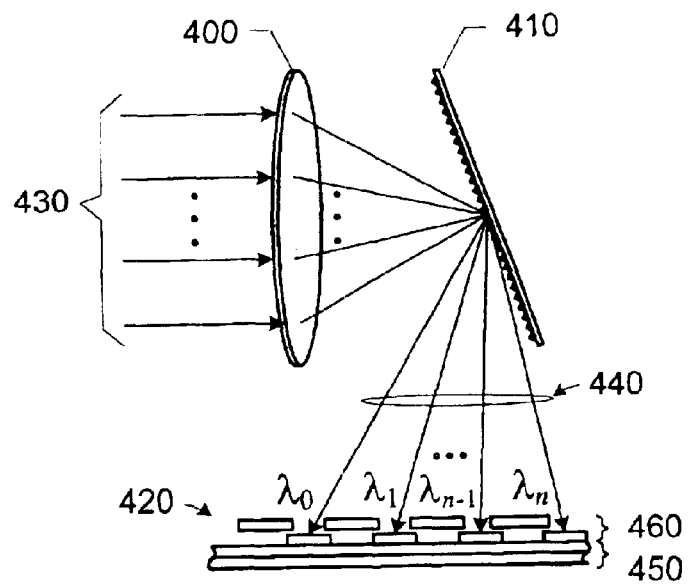
FIG. 4 conceptually illustrates selected elements of the system in FIG. 2.

FIG. 4 conceptually illustrates one particular implementation of the optical train 320, optically dispersive element 330, and the focal plane array 340 of the system 300 in FIG. 3. In the illustrated implementation, the optically dispersive element 410 is a diffraction grating, but alternative embodiments (not shown) may employ, e.g., a linear variable filter instead. The received radiation 430 includes the laser radiation actively generated and received by the active LADAR subsystem (not shown) of the platform 110 and the electromagnetic radiation passively received from the scene conditions as described above. The received radiation 430 is directed through the lens 400, which focuses the received radiation 430 onto the optically dispersive element 410. The received radiation 430 is reflected by the optically dispersive element 410 onto the focal plan array 420. In so doing, the optically dispersive element 410 separates the received radiation 430 into its constituent spectral components 440, each having a different, respective wavelength $\lambda_0$–$\lambda_n$.

Thus, by way of example and illustration, the diffraction grating with which the optically dispersive element 410 is implemented in FIG. 4 comprises but one means for separating the received radiation 430 into the spectral components 440. The optically dispersive element 410 separates by diffraction, but other separation mechanisms may be employed. A linear variable filter, for instance, as was mentioned above, separates by filtering the received radiation 430 into spectral components 440. Thus, a linear variable filter comprises a second means separating the received radiation 430 into the spectral components 440. The present invention therefore admits variation in the mechanism and manner in which the spectral components 440 are obtained from the received radiation 430.

In one particular implementation of the illustrated embodiment, n=4, and the optically dispersive element 410, shown in FIG. 4, diffracts the received radiation 430 into five spectral components 440. The laser signal 100, shown in FIG. 3, has a wavelength of either 1.5 µm or 2.1 µm. Thus, $\lambda_0$=1.5 µm or $\mu_0$=2.1 µm. The focal plane array 420 therefore passively detects, e.g., infrared, radiation in four narrow spectral bands. These four spectral bands have peak wavelengths of 2.3 µm, 3.5 µm, 4.2 µm, and 4.6 µm, respectively. Thus, in this particular implementation, $\lambda_1$=1.5, µm, =2.1 µm, $\lambda_3$=1.5 µm, and $\lambda_4$=2.1 µm, respectively. Note, however, that the invention is not limited to these values for $\lambda_0$–$\lambda_n$. For instance, the laser signal 100 may generally have any "eye-safe" wavelength. Similarly, the wavelengths for the passively detected infrared radiation 170 may be varied from the number provided for this particular implementation.

One particular embodiment of the focal plane array 420, first shown in FIG. 4, is more particularly illustrated in FIG. 5A and FIG. 5B. The focal plane array 420 includes, in the illustrated embodiment, a read out integrated circuit ("ROIC") 450 and a detector array 460. FIG. 5A shows the "top" of the focal plane array 420, i.e., the detector array 460, and FIG. 5B shows the "bottom" of the focal plane array, i.e. the ROIC 450, in plan views. The detector array 460 comprises a plurality of detectors 520 arrayed in columns $530_0$–$530_n$. Each detector 520 represents one pixel of data. One column of detectors (e.g., $530_0$) is dedicated to active imaging with LADAR data and the remaining columns (e.g., $530_1$–$530_n$) are dedicated to passive infrared, multi-spectral imaging in the illustrated embodiment.

In illustrated embodiment, however, the detectors 420 are quantum well infrared photodetectors ("QWIPs"). The QWIPs 420 are fabricated from GaAs/AlGaAs or InGaAs/AlGaAs or InGaAs/GaAs multiple quantum well materials ("MQW"), possess attributes suitable for both active and passive detection. QWIPs based on GaAs/AlxGal-xAs and other III-V MQW materials present the benefits of high material uniformity, low noise and mature processing techniques. This detector technology is readily amenable to producing large format FPAs with high uniformity and operability and exhibits excellent long-term stability. One difficulty has been low optical coupling due to a quantum mechanical selection rule, which only allows absorption of radiation with an electric field component normal to the MQW layers. To facilitate effective coupling of the radiation various approaches have been developed that include adding diffraction gratings, random reflectors and etched diffractive resonant optical cavity ("DROC") structures. The DROC approach, also called the Enhanced QWIP ("EQWIP") has resulted in quantum efficiency ("QE") as high as 50% in long wavelength infrared ("LWIR") detectors the highest achieved in QWIPs.

Because EQWIPs are true resonant devices, the full width at half maximum ("FWHM") of the detector spectral response is also the narrowest of all QWIPs. In the present invention, the DROC parameters are tuned to span the 1.5–14 µm wavelength range while retaining high detector performance. In this approach, as discussed elsewhere, the adjacent rows of pixels detect at specifically tuned peak wavelengths in narrow spectral bands but cover a relatively broad spectral band across the FPA. Spectral response FWHM as narrow as 0.4 µm at 8.5 µm has been achieved despite the use of relatively low-resolution contact photolithography based processing. EQWIPs offer several benefits for high-speed LWIR detectors, including: lower detector capacitance due to the reduced detector volume; tunability to match laser wavelength, thereby permitting preset multi-wavelength detection on the same chip so that laser wavelength can be varied; efficient optical coupling; and higher operating temperature by 15 K over conventional QWIPs.

QWIPs are intrinsically high-speed detectors due to their short carrier lifetime ($\tau_{life}$~5 ps). The high frequency response of QWIPs has been measured by microwave rectification and optical heterodyne techniques. Rectification frequency of 33 GHz has been measured, see Liu et al., 32 IEEE J. Quant. Electron. 1024 (1996), for QWIPs with 16 wells. With optical heterodyne techniques on a 100 well QWIP a frequency response of 83 GHz has been measured, see Liu et al., 67 Appl. Phys. Lett. 1594 (1995).

Other detector technologies may be also employed. The individual detectors 520 may be implemented as practically any kind of avalanche photodiode, Indium Antimonide, or quantum well infrared photodetector ("QWIP") technology. QWIPs, in particular, are well known in the art and may be employed. QWIPs suitable for passive infrared, multi-spectral detection in the present invention are, for example, disclosed in the following:

U.S. Pat. No. 6,452,187, entitled "Two Color Grating Coupled Infrared Photodetector," issued Sep. 7, 2002, to Lockheed Martin Corporation as assignee of the inventors Lewis T. Claiborne, et al.; and U.S. Pat. No. 6,180,990, entitled "Hyper spectral Radiation Detector," issued Jan. 30, 2001, to Lockheed Martin Corporation as assignee of the inventors Lewis T. Claiborne, et al.

Note that these technologies may employ alternative materials and fabrication techniques. QWIPs, for instance, frequently are fabricated in Gallium Arsenide (GaAs). Thus, the present invention is not limited to APDs fabricated in Mercury-Cadmium-Tellurium (HgCdTe).

FIG. 6 and FIG. 7 depict two particular, alternative structures for the detectors 520 in to FIG. 5. Note that, in the illustrated embodiment, the detectors 520 all have the same construction, although this is not necessary to the practice of the invention. FIG. 6 and FIG. 7 illustrate individual pixels 600, 700, respectively, as may be used to implement the detectors 520 in section views. The pixels 600, 700 can be replicated to produce a complete two-dimensional imager detector array 460 of practically any desired size, such as 64 pixels by 64 pixels or larger. It is to be noted that both pixels 600, 700 are simultaneously sensitive to both passive and active detection. The detector subsystem 120 uses a single focal plane array 420 sensitive to both passive and active detection as opposed to two separate imagers each sensitive to only the passive or active detection.

Referring now to FIG. 6, the pixel 600 includes an upper layer array common contact 605, one element of which is represented by the contact 605a. This forms a common electrical contact for the signals detected by the pixels 600 of the detector array 460. This design is based on III-V semiconductor materials and is preferably composed of either Gallium Arsenide/Aluminum Gallium Arsenide (GaAs/AlGaAs) or Indium Gallium Arsenide/Indium Phosphorous (InGaAs/InP). In a pixel 600 using either of these materials, the passive portion of the imager comprises a photoconductor based on inter-subband transitions. This type of detector is a QWIP. The absorbing transition may be in either the conduction or valence energy bands. Due to the absorption mechanism, an optical coupler, typically a diffraction grating, is used to increase sensitivity. This grating may be either a surface grating or the much deeper cavity-based grating as used in an enhanced QWIP or EQWIP, such as described in U.S. Pat. No. 5,539,206, entitled "Enhanced Quantum Well Infrared Photodetector," issued Jul. 23, 1996, to Lockheed Martin Corporation as assignee of the inventor Thomas R. Schimert.

The MWIR or LWIR absorbing region 615 comprises a stack of multiple quantum wells as described in U.S. Pat. No. 5,539,206. They are placed between the array contact 605 and an intermediate contact 610. The signal produced by absorption of the MWIR or LWIR radiation is generated between the contacts 605 and 610. In one particular implementation, the GaAs quantum wells are 30–50 angstroms wide and separated by 300–600 angstrom AlGaAs barriers. The wells and contact layers are doped in the range of $5 \times 10^{17}$ to $5 \times 10^{18}$. Alternatively, the structure may be composed of InGaAs wells and InP barriers.

Still referring to FIG. 6, a SWIR absorbing region 625 preferably may comprise InGaAs. The region 615 is positioned between the intermediate contact 610 and a contact 620. A SWIR radiation signal is produced between contacts 610 and 620. The SWIR absorber region 625 is preferably composed of $In_{0.53}Ga_{0.47}As$ that is lattice matched to InP. This composition provides a spectral response that will strongly absorb radiation at the preferred LADAR laser wavelength of 1.55 $\mu$ms. A typical thickness for the SWIR absorber region 625 is 2–4 $\mu$m. The SWIR absorber region 625 in conjunction with intermediate contact 610 and contact 620 can form a photoconductor, a photodiode, or an avalanche photodiode.

Turning now to FIG. 7, the pixel 700 is illustrated. This implementation is composed of the II-VI semiconductor material HgCdTe, and uses a double stack for absorbing the two different bands of IR radiation. The incident IR radiation must be incident on the SWIR absorbing stack first with the longer wavelength radiation (MWIR or LWIR) passing through to be absorbed in the second stack. Both the SWIR and the MWIR or LWIR stacks are formed to comprise P-n junctions, preferably hetero-junctions. The sensor 700 has a supporting substrate 710 comprising CdZnTe. A SWIR receiver comprises a P region 714 and an n region 720, both comprising HgCdTe. The longer wavelength incident IR radiation is absorbed by regions 725 and 730, both of which comprise HgCdTe.

Further referring to FIG. 7, the short wavelength IR radiation is absorbed by the Pn junction comprising regions 714 and 720. The signal is conducted away from the pixel through a conductor 735 and a conductor 740. For the SWIR radiation, the region 725 functions essentially as a conductor. A longer wavelength IR radiation signal is produced by the structure comprising regions 725 and 730 with the longer wavelength IR radiation signal generated between the conductor 740 and a conductor 745. Typical compositions for the various layers are $Hg_{0.8}Cd_{0.2}Te$ for the LWIR absorbing layer, $Hg_{0.7}Cd_{0.3}Te$ for the MWIR absorbing layer, and $Hg_{0.35}Cd_{0.65}Te$ for the SWIR absorbing layer.

Figure 8A:
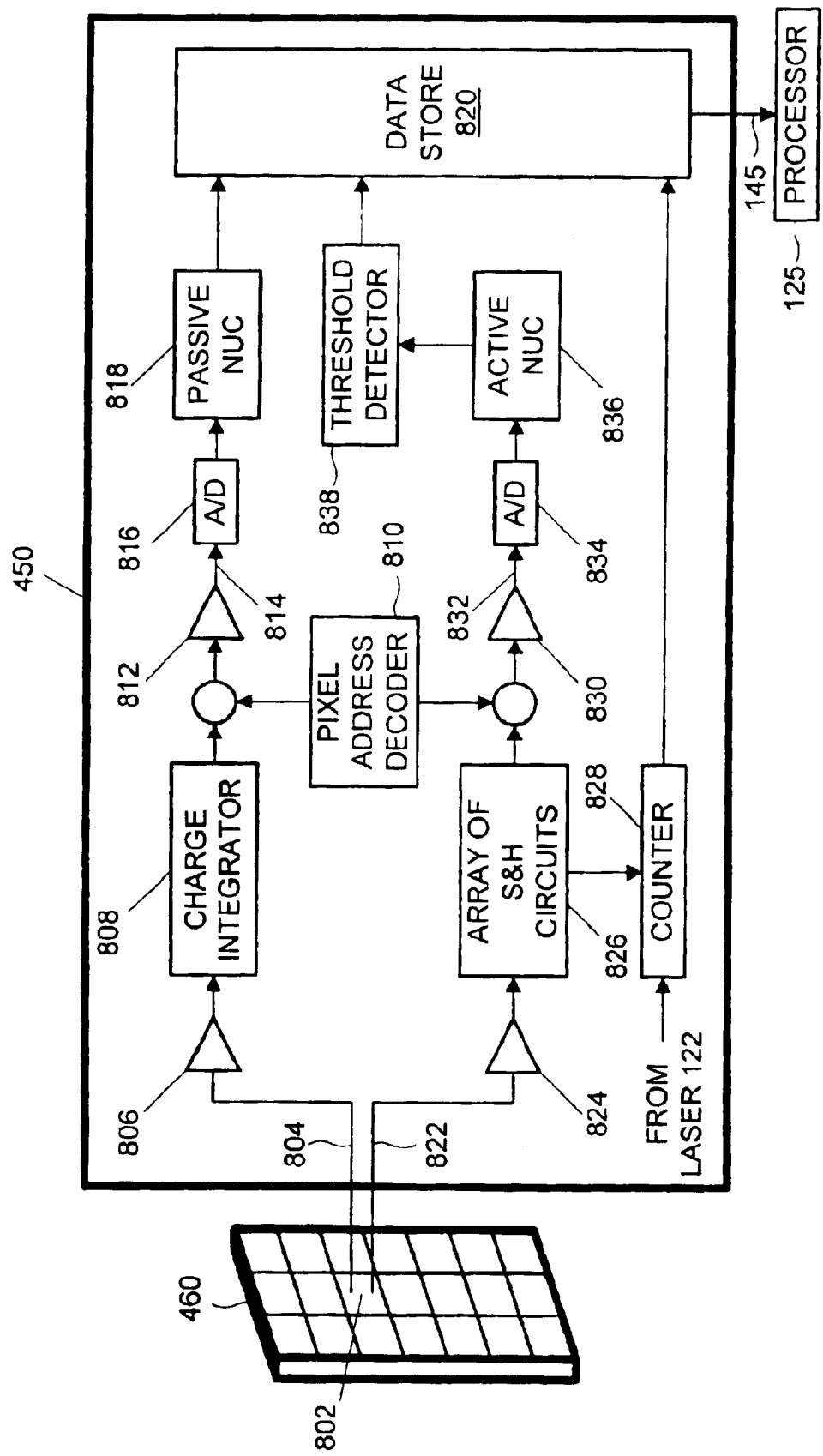
FIG. 8A–FIG. 8B illustrate, in block diagrams, the electronics for the read-only integrated circuit in FIG. 5B in alternative embodiments.
Figure 8B:
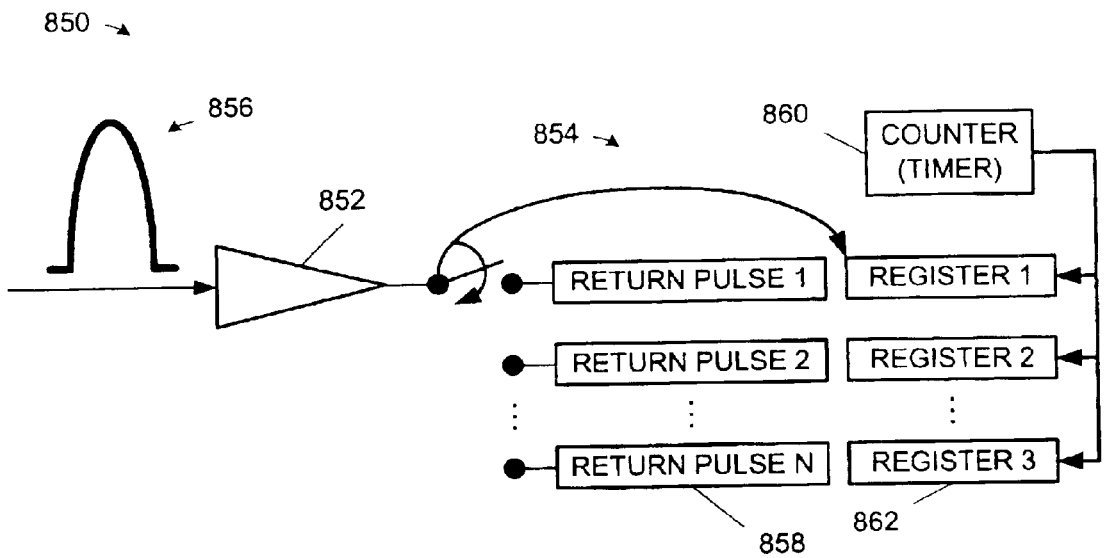

FIG. 8A illustrates one particular embodiment of the ROIC 450, first shown in FIG. 4, within focal plane array 420 for collecting passive IR data and active LADAR data. The passive image signal from a particular detector 520 (shown in FIG. 5A) representing a pixel 802 is transferred through a line 804, through an amplifier 806, to a charge integrator 808. The passive image signal is integrated for a predetermined integration time. The integrated signal for a particular pixel 802 is readout when the address decoded by pixel address decoder 810 corresponds to the particular pixel 802. The integrated signal is amplified by output amplifier 812 that drives passive column data bus 814. The analog amplified integrated signal is then digitized by analog-to-digital converter 816. The resultant digital signal is corrected for passive imager non-uniformity and other possible system non-uniformities in passive non-uniformity corrector ("NUC") 818. The corrected passive digital signal corresponding to pixel 802 is then stored in data store 820 creating a two-dimension passive image data set. The passive image data set is then transferred to processor 125 via line 145.

Several input amplifier circuit designs can be used for the amplifier 806. These include direct injection, buffered direct injection, and capacitive transimpedance amplifiers, among others. Each of these designs has advantages and disadvantages, primarily based upon the detector array 460 design, the operating temperature of the imager, and allowable power dissipation.

The charge integrator 808 likewise has several design possibilities. These include charging a capacitor to a predetermined voltage and draining the capacitor charge through an imager pixel during the integration time if the device is a photoconductor, charging a capacitor if the device is photodiode, and others that handle high or low dark currents, subtraction of dark currents, etc. As with the input amplifier 806, selection of the charge integrator design is based upon the detector array 460 design, the operating temperature of the imager, and power dissipation.

The passive non-uniformity corrector 818 can implement several different non-uniformity correction techniques. For devices, such as QWIPs and EQWIPs, which have a degree of linear uniformity across the detector array 460, a simple offset correction can suffice. For an detector array 460 that has devices with varying linearity across the detector array 460, both offset and gain correction can be implemented. For applications requiring greater non-uniformity correction, a table look-up process can be implemented. Possible system non-uniformity sources include a $cosine^4$ term due to the optical train 320.

The active LADAR image signal from a particular pixel 802 is transferred through a line 822, through an amplifier 824, to an array of sample and hold (S&H) circuits 826. The timing of each S&H circuit is triggered by a counter 828, which itself is triggered by the start of a pulse from laser 110. The S&H circuits 826 therefore each correspond to a range in the imaged scene 150. Each S&H circuit 826 for a particular pixel 802 is readout when the address decoded by pixel address decoder 810 corresponds to the particular pixel 802. The signal from each S&H circuit 826 is sequentially amplified by output amplifier 830 that drives active column data bus 832. The analog amplified S&H signal from each S&H circuit 826 is then digitized by analog-to-digital converter 834. The resultant digital signal is corrected for active imager non-uniformity, and other possible system non-uniformities in active non-uniformity corrector 836. The digitized corrected active image signals corresponding to each S&H circuit 826 from pixel 802 are passed through a threshold detection circuit 838. The threshold detected S&H signals, and their corresponding times from counter 828 are then stored in data store 820 creating an active image data set. The active image data set is then transferred to processor 125 via line 145. The processor 125, using the corresponding times, calculates the range to an object for each pixel 802 thus creating a three-dimension active image data set.

Issues relating to the active channel amplifier 824 and the non-uniformity corrector 104 are similar to those of the passive portion of the ROIC 450. Further sources of active system non-uniformity are laser-speckle and any effects associated with the polarized laser radiation.

The array of S&H circuits 826 is subject to several limitations. The number of S&H circuits 826 will be a trade off between the space available for each pixel 802 and the desire for a large depth (range) of image collection with high resolution. For military type targets, a resolution of less than a meter can be required. Coupled with potentially large targets, 32 S&H circuits 826 are the minimum with more than 32 being desired for greater range resolution. The absolute range resolution also limits the arrays of S&H circuits 826 as the time between each sampling command is limited. An upper limit to the sampling rate is approximately 500 MHz using current integrated circuit processing technology. This results in a range resolution of one-third meter.

The requirements for the portion of the ROIC 450 that processes the active LADAR signals are driven by a burst-illumination LADAR. A burst illumination LADAR system requires only a single laser pulse. The return pulse waveform is sampled at predetermined times creating a step-wise continuous waveform. The difference in time between each sampling $\tau_1$ determines the range resolution. Sampling the return pulse waveform every two nanoseconds (500 MHz) provides one-third meter range resolution. Due to a limited number of S&H circuits, the starting time for the sampling process is determined by the range to the potential target, the number of S&H circuits 826 in the S&H circuit array 826 for each pixel within the semiconductor detector array 460, and the required range resolution. Preferably, half the S&H circuits 826 for each pixel will be used on either side of the optimal time $\tau_0$ based upon the range to the potential target. This will center the potential target within the active image data set. The sampled waveform for each pixel within the semiconductor detector array 460 is read out for subsequent processing to produce the active image data set. Alternatively, a preliminary laser pulse may be used in a range finding mode. This allows higher resolution sampling of the burst illumination LADAR pulse as the optimal time $\tau_0$ is more accurately known. If a system is only used for targets within a given fixed range, then $\tau_0$ may be established a priori.

In operation, the preliminary passive search culminates with a laser range finding pulse in the illustrated embodiment. A preliminary search passive image data set is updated concurrently with a laser pulse for temporal alignment between the active and passive image data sets. In a preferred embodiment, the semiconductor detector array 460 comprises 64 pixels in both the x and y coordinates for a total of 4,096 pixels for active imaging. With 32 S&H circuits 826 per pixel and a data read out rate of 1 MHz, the data cycle time for a single pulse is approximately 160 milliseconds to read out the active image data set. The passive image data set will also be available for subsequent processing at the conclusion of the active data set's required 160 millisecond readout.

As semiconductor processing advances, higher sampling and readout rates will be possible. The present invention can then be used to create real time, video rate three-dimensional imagery. The three-dimensional imagery can be displayed with either the magnitude of the IR emission, or the magnitude of the LADAR return signal.

Note that the ROIC 450 admits variation in implementation. Consider the circuit 850, which is an individual circuit for an individual one of the pixels 802 (shown in FIG. 8A). A threshold detector 852 activates a S&H circuit 854 when the magnitude of the analog output 856 of the detector exceeds a predetermined value. Multiple memory buffers 858 (only one indicated) allow multiple return pulsed to be captured for each pixel 802, which will be useful when imaging through obscurants that produce multiple returns. The time at which the threshold detector 852 actuates the S&H circuit 854, as measured by the counter (timer) 860, can also be stored in the registers 862 (only one indicated). The ROIC 450 includes a master clock (e.g., the counter 860) that is accessible by each unit cell (i.e., circuit 850) of the ROIC 450. When the threshold detector 852 activates the S&H circuit 854, the content of the counter 860 is latched into the registers 862. The latched value is the range offset and indicates a rough estimate of when the return pulse is received. Further processing of the sampled analog signal determines the fine range and pixel reflectivity. The passive image can still be collected as described above in connection with FIG. 8A.

Returning to FIG. 4, as was mentioned above, in the detector array 460, one column $430_x$ (e.g., $430_0$) is dedicated to three-dimensional LADAR imaging while the remaining columns $430_x$ (e.g., $430_1$–$430_n$) are dedicated to passive infrared, multi-spectral imaging. The one column $430_x$, dedicated to three-dimensional LADAR imaging operates at high speed in a sample and hold mode. The remaining columns $430_x$ permit long integration times for the passive imaging. In one particular implementation, the circuitry for the passive columns $430_x$ uses standard integrating unit cells. The active column $430_x$ uses the sampling technique discussed above.

Figure 9:
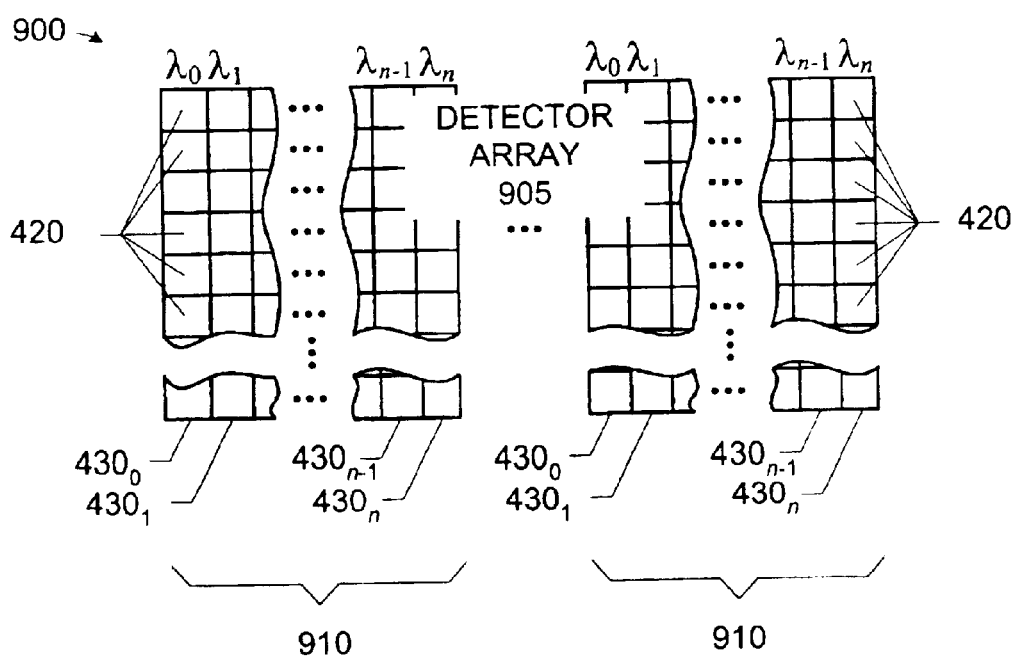
FIG. 9 is a conceptualized top, plan view of a detector array for the focal plane array alternative to the detector array of FIG. 5A.

The focal plane array 320 will more typically be implemented using multiple sets of active/passive detector columns $430_x$ in the detector array. FIG. 9 illustrates one such detector array 900. The detector array 900 includes a plurality of columns $430_0$–$430_n$ arranged in sets 910, each set containing the one column (e.g., column $430_0$) of active LADAR detectors and multiple columns of passive infrared detectors (e.g., columns $430_1$–$430_n$). Thus, the focal plane array 320, in this implementation operates with one column $430_0$ in every set 910 dedicated to three-dimensional LADAR imaging in conjunction with a 1.5 μm or 2.1 μm laser. The other four columns $430_1$–$430_4$ of every set 910 are dedicated to passive infrared imaging in four narrow bands with peak wavelengths at 2.3 μm, 3.5 μm, and 4.6 μm. As was noted earlier, however, other wavelengths may be employed in alternative embodiments.

The QWIPs 420 can be relatively large in this particular implementation (e.g., 40 μm by 80 μm) where the pitch is 40 μm in the spatial direction and 80 μm in the spectral direction. This pitch in the spatial direction permits high resolution imaging while this pitch in the spectral dimension self-compensates for beam jitter and allows for maximum circuitry for signal processing the ROIC 350 unit cells. As will be appreciated by those skilled in the art having the benefit of this disclosure, however, the various values for $\lambda_0$–$\lambda_n$ will affect the dimensions of the structures for the focal plane array 320.

Wavelength responsivity for different portions of the focal plane array 320 employing the detector array 900 can be varied by altering the physical dimensions of the detector's diffractive resonant-structure for different sections of the focal plane array 320. One such technique, employed for hyperspectral detection of passive IR radiation only, is disclosed in U.S. Pat. No. 6,180,990, entitled "Hyper spectral Radiation Detector," issued Jan. 30, 2001, to Lockheed Martin Corporation as assignee of the inventors Lewis T. Claiborne, et al. However, although not apparent from this reference itself, the principle of varying physical dimensions can be extrapolated to active LADAR detection in addition to hyperspectral passive IR detection. See also P. Mitra, et al., "Multispectral Quantum Well Infrared Photodetectors," Applied Physics Letters, May 12, 2003.

The principle physical dimensions to be altered are the pitch, which is the distance between the center lines of the detectors 420, and the width of each of the detectors 420. By changing these physical dimensions, each portion of the detector array 900 having selected dimensions is tuned to be responsive to a particular band of infrared radiation. By stepping the pitch to greater values from one pitch segment (not shown) of the detector array 900 to the next, and by varying the width of the detectors 420 within each pitch segment, the principle band of radiation sensitivity can be shifted progressively so that a substantial portion of a particular spectrum can be collected and each band of information analyzed individually.

The x-dimension (rows) of the detector array 900 provide a linear dimension for the field of view 225 (shown in FIG. 2). With the movement of this linear dimension over the field of view 225, a two dimensional image can be produced by periodically sampling each of the detectors 420 within the detector array 900 dedicated to passive infrared detection. As was mentioned above, interspersed among the passive detectors 420 are active detectors 420, which contemporaneously detect reflected LADAR radiation. Each column in the detector array 900 essentially corresponds to a pixel element of the scene 150, but with multiple contiguous bands of information being collected substantially at one time, thereby providing much greater information about what is present within the field of view 225, in contrast to collecting only a single band of radiation.

Returning to FIG. 3, the optically dispersive element 310 is shown to be external to the focal plane array 320 in the illustrated embodiment. However, as was discussed relative to the detector of FIG. 6, a diffraction grating may be employed with the QWIPs to increase sensitivity. These diffraction gratings may be surface gratings or the much deeper cavity-based surface gratings. Both types of gratings are known to the art, and the embedded diffraction grating is more fully disclosed in U.S. Pat. No. 5,539,206, entitled "Enhanced Quantum Well Infrared Photodetector," issued Jul. 23, 1996, to Lockheed Martin Corporation as assignee of the inventor Thomas R. Schimert. These diffraction gratings can also be employed as the optically dispersive element 310 of FIG. 3, and so the optically dispersive element 310 may be external to the focal plane array, as shown, or embedded therein.

Once the data has been acquired, it can be processed in any suitable manner known to the art. Note that, in some embodiments, the processing may include treatments to, e.g., enhance the resolution of the LADAR data. The acquired data may also be employed for any suitable purpose. In a military context, the data could be employed, for instance, in an automated target recognition ("ATR") system. Or, the data may be processed to enhance accuracy, or for use in other techniques of target identification. The data may also be processed in way suitable for civilian use, depending on the particular implementation. In one particular embodiment, however, the active LADAR data and the passive infrared data are "fused," to generate a single data set.

In one particular embodiment, the data is processed as set forth in U.S. Pat. No. 5,511,015, entitled "Double-accumulator Implementation of the Convolution Function," issued Apr. 23, 1996, to Loral Vought Systems Corporation as assignee of the inventor Stuart W. Flockencier. In general, the data is continuously digitized and processed. The largest return is stored. The stored data is then passed through a convolution peak detector function to extract pulse position from the data. The entire captured pulse is used to minimize the effects of signal strength variation, noise, and distortions. A programmed template, designed to match the nominal pulse shape, is convolved with the data in steps of one data sample. When the data most accurately matches the template, the convolver output is maximum, giving the pixel range. The maximum convolver output value at this point is proportion to the return pulse energy, which yields the time of flight and intensity for the returned pulse.

Thus, data extracted from the active detectors 420 can then be fused with the data sampled from the passive detectors 420 to generate a more detailed image of the field of view 225 within the scene 150. The detection of multiple bands of infrared radiation provides spectral resolution across a broad band of detectable passive IR radiation permitting separate processing for the particular wavelength component. Thus, multiple infrared data sets can be generated that can then be fused with the spatial data actively extracted from the LADAR radiation to provide a more complete data set. The fused data set will not only combine the advantages of passively detected IR data with those of actively detected LADAR data, but will also provide additional detail in that might not be available in all bands across the broad band of detectable IR radiation.

Returning to FIG. 2, Note that the platform 110 is a flying submunition in the illustrated embodiment. However, the invention is not so limited. The platform 110 may be some other type of airborne platform, such as a drone or an aircraft. Indeed, the platform 110 is not limited to airborne platforms, but may also be ground-based or even a vessel afloat in a body of water. The present invention is not limited by the particular implementation of the platform 110 in this manner so long as it implements the invention as described above and claimed below.

Figure 10:
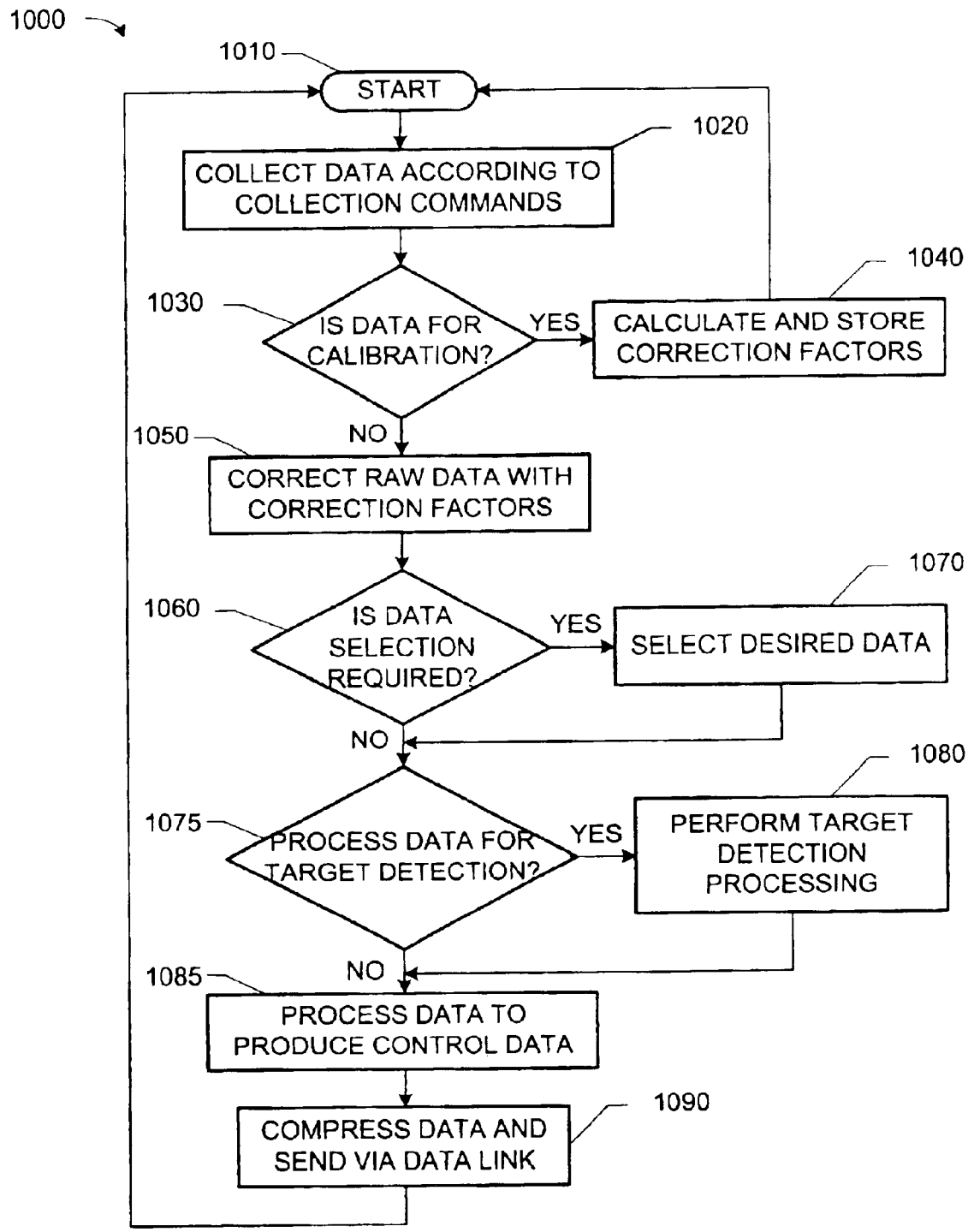
FIG. 10 is a flow diagram illustrating data collection, processing and transfer in accordance with one embodiment of the present invention.

A sequence of operations for the system 200 illustrated in FIG. 2 are shown in a flow diagram illustrated in FIG. 10. Upon initialization (at 1010), the system 200 collects data (at 1020) according to collection commands which have been provided to the system 200. The collection commands may be, e.g., received from the ground control station 295a, received from the airborne platform 295b, or preprogrammed and stored. These commands may include identification of particular spectral bands that are to be aggregated by the processor 250 and to eliminate the spectral bands statistically indicated as a signal of no signal of interest or have a low signal to noise ratio. The command signals can also include directions to perform target processing.

A determination is then made (at 1030) if the data currently being collected is for calibration purposes. If so, correction factors are calculated and stored (at 1040) for the received raw data for later use. Such correction factors are determined, e.g., by the non-uniformity in response of the focal plane array 240. Exemplary aspects subject to the correction factors are detector response gain and offset. Control is then returned to the start (at 1010). If the data is not used for the purpose of calibration, it is to be processed and analyzed. The raw data is therefore then corrected (at 1050) with the previously stored correction factors.

After the data has been corrected (at 1050), the system 200 determines (at 1060) whether a command has been made to select particular data. If so, the desired data is selected (at 1070) for the current collection operation. The system 200 then determines (at 1075) whether the data should be processed for target detection. If so, target detection processing is performed. Target detection processing is performed (at 1080) in accordance with conventional techniques. The system 200 then processes (at 1085) the LADAR and infrared data obtained from the received radiation 210. This and other data individually, or in combination, is utilized to produce control data used by the controller 260 to direct the operations of the optical train 220 and the focal plane array 240. In some embodiments, the data is then compressed and sent (at 1090) via the data link 290 to a selected location such as the ground control station 295*a* or to the airborne platform 295*b*.

This concludes the detailed description. The particular embodiments disclosed above are illustrative only, as the invention may be modified and practiced in different but equivalent manners apparent to those skilled in the art having the benefit of the teachings herein. For instance, although the illustrated embodiment passively detects IR radiation, radiation of other frequencies may also be passively detected. Furthermore, no limitations are intended to the details of construction or design herein shown, other than as described in the claims below. It is therefore evident that the particular embodiments disclosed above may be altered or modified and all such variations are considered within the scope of the invention as claimed below. Accordingly, the protection sought herein is as set forth in the claims.

What is claimed:

1. A multi-spectral detector for use in a passive/active system, comprising:
   an optically dispersive element capable of separating received LADAR radiation and radiation received from a scene into a plurality of spectral components and distributing the separated spectral components; and
   a detector array including:
      a plurality of detectors capable of detecting the LADAR radiation; and
      a plurality of detectors capable of detecting the spectral components of the scene radiation; and
   an integrated circuit capable of generating a plurality of electrical signals representative of predetermined characteristics of the detected LADAR radiation and the detected spectral components.

2. The detector of claim 1, wherein the optically dispersive element comprises a diffraction grating or a linear variable filter.

3. The detector of claim 2, wherein the optically dispersive element is integrated with the detector array.

4. The detector of claim 1, wherein the optically dispersive element is integrated with the detector array.

5. The detector of claim 1, wherein the detectors capable of detecting the LADAR radiation or the detectors capable of detecting the spectral components of the scene radiation comprise QWIPs or EQWIPs.

6. The detector of claim 1, wherein the detectors capable of detecting the LADAR radiation or the detectors capable of detecting the spectral components of the scene radiation have varied widths and are separated by varied pitches.

7. The detector of claim 6, wherein the detectors capable of detecting the LADAR radiation or the detectors capable of detecting the spectral components of the scene radiation comprise QWIPs or EQWIPs.

8. The detector of claim 1, wherein the detector array is integrated with the integrated circuit.

9. The detector of claim 8, wherein the optically dispersive element is integrated with the detector array.

10. A multi-spectral detector for use in a passive/active system, comprising:
    means for distributing a plurality of spectral components of received LADAR radiation and radiation received from a scene;
    means for detecting the distributed LADAR radiation;
    means for detecting the spectral components of the infrared radiation; and
    means for generating a plurality of electrical signals representative of predetermined characteristics of the detected LADAR radiation and the detected spectral components.

11. The detector of claim 10, wherein the distributing means diffracts the received LADAR and radiation.

12. The detector of claim 11, wherein the distributing means comprises a diffraction grating.

13. The detector of claim 10, wherein the distributing means comprises a diffraction grating.

14. The detector of claim 10, wherein the distributing means is integrated with the detecting means.

15. The detector of claim 10, wherein the detecting means comprises QWIPs or EQWIPs.

16. The detector of claim 10, wherein detecting means comprises a plurality of detectors have varied widths and are separated by varied pitches.

17. The detector of claim 10, wherein the detecting means is integrated with the generating means.

18. An imaging system, comprising:
    a laser capable of transmitting LADAR radiation;
    a multi-spectral detector for use in a passive/active system, comprising:
       an optically dispersive element capable of separating received LADAR radiation and radiation received from a scene into a plurality of spectral components and distributing the separated spectral components; and
       a detector array including:
          a plurality of detectors capable of detecting the LADAR radiation; and
          a plurality of detectors capable of detecting the spectral components of the scene radiation; and
       an integrated circuit capable of generating a plurality of electrical signals representative of predetermined characteristics of the detected LADAR radiation and the detected spectral components; and
    a processor for processing the electrical signals.

19. The imaging system of claim 18, wherein the optically dispersive element comprises a diffraction grating or a linear variable filter.

20. The imaging system of claim 18, wherein the optically dispersive element is integrated with the detector array.

21. The imaging system of claim 18, wherein the detectors capable of detecting the LADAR radiation or the detectors capable of detecting the spectral components of the scene radiation comprise QWIPs or EQWIPs.

22. The imaging system of claim 18, wherein the detectors capable of detecting the LADAR radiation or the detectors capable of detecting the spectral components of the scene radiation have varied widths and are separated by varied pitches.

23. The imaging system of claim 18, wherein the detector array is integrated with the integrated circuit.

24. A method for use in identifying an object in a field of view, comprising:
    passively detecting radiation from a scene, the detection employing a detector array; and actively detecting LADAR radiation through the detector array in parallel with passively detecting the scene radiation.

25. The method of claim 24, wherein passively detecting scene radiation includes passively detecting infrared radiation.

26. The method of claim 25, wherein passively detecting infrared radiation includes passively detecting hyperspectral infrared radiation.

27. The method of claim 24, wherein passively detecting scene radiation includes passively detecting hyperspectral scene radiation.

28. The method of claim 24, further comprising receiving the scene and LADAR radiation through the same optical train.

29. The method of claim 28, wherein detecting the scene and LADAR radiation includes separating the received LADAR and scene radiation into a plurality of spectral components and distributing the separated spectral components across the detector array.

30. The method of claim 24, further comprising generating a plurality of electrical signals representative of predetermined characteristics of the detected LADAR radiation and the detected spectral components.

31. An apparatus for use in identifying an object in a field of view, comprising:
means for passively detecting scene radiation employing a detector array; and
means for actively detecting LADAR radiation through the detector array in parallel with passively detecting the scene radiation.

32. The apparatus of claim 31, wherein the means for passively detecting scene radiation includes means for passively detecting infrared radiation.

33. The apparatus of claim 31, wherein the means for passively detecting scene radiation includes means for passively detecting hyperspectral scene radiation.

34. The apparatus of claim 31, further comprising means for receiving the scene and LADAR radiation through the same optical train.

35. The apparatus of claim 31, further comprising means for generating a plurality of electrical signals representative of predetermined characteristics of the detected LADAR radiation and the detected spectral components.

36. A method, comprising:
receiving LADAR and scene radiation from a field of view;
separating the received LADAR and scene radiation into a plurality of spectral components;
directing the spectral components to respective detectors;
detecting the spectral components; and
generating an electrical signal representative of predetermined characteristics of the detected spectral components.

37. The method of claim 36, wherein receiving the scene radiation includes receiving infrared radiation.

38. The method of claim 36, wherein receiving the scene radiation includes receiving hyperspectral scene radiation.

39. The method of claim 36, wherein receiving the scene and LADAR radiation includes receiving the scene and LADAR radiation through the same optical train.

40. An apparatus, comprising:
means for receiving LADAR and scene radiation from a field of view;
means for separating the received LADAR and scene radiation into a plurality of spectral components;
means for directing the spectral components to respective detectors;
means for detecting the spectral components; and
means for generating an electrical signal representative of predetermined characteristics of the detected spectral components.

41. The apparatus of claim 40, wherein the means for receiving the scene radiation includes means for receiving infrared radiation.

42. The apparatus of claim 40, wherein the means for receiving the scene radiation includes means for receiving hyperspectral scene radiation.

43. The apparatus of claim 40, wherein the means for receiving the scene and LADAR radiation includes means for receiving the scene and LADAR radiation through the same optical train.

44. The apparatus of claim 31, further comprising:
means for separating received LADAR radiation and radiation received from a scene into a plurality of spectral components; and
means for distributing the separated spectral components across the detector array.

* * * * *